United States Patent
Hansalia

(10) Patent No.: US 11,650,744 B2
(45) Date of Patent: May 16, 2023

(54) VIRTUAL ELASTIC QUEUE

(71) Applicant: ARRIS Enterprises LLC, Suwanee, GA (US)

(72) Inventor: Rakesh G. Hansalia, Milpitas, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 18 days.

(21) Appl. No.: 17/352,476

(22) Filed: Jun. 21, 2021

(65) Prior Publication Data

US 2021/0405897 A1    Dec. 30, 2021

Related U.S. Application Data

(60) Provisional application No. 63/046,469, filed on Jun. 30, 2020.

(51) Int. Cl.
*G06F 3/06* (2006.01)

(52) U.S. Cl.
CPC .......... *G06F 3/0632* (2013.01); *G06F 3/0604* (2013.01); *G06F 3/0659* (2013.01); *G06F 3/0673* (2013.01)

(58) Field of Classification Search
CPC .... G06F 3/0632; G06F 3/0604; G06F 3/0659; G06F 3/0673; G06F 3/061; G06F 3/067
See application file for complete search history.

(56) References Cited

U.S. PATENT DOCUMENTS

| | | | | |
|---|---|---|---|---|
| 4,017,474 A | * | 4/1977 | Glasser | C08G 18/6705 530/502 |
| 6,049,802 A | * | 4/2000 | Waggener, Jr. | G06F 5/065 707/999.1 |
| 6,151,301 A | * | 11/2000 | Holden | H04L 49/255 370/414 |
| 11,421,212 B2 | * | 8/2022 | Miller | C12N 9/2428 |
| 2003/0145012 A1 | * | 7/2003 | Kurth | G06F 16/9024 |
| 2005/0138197 A1 | * | 6/2005 | Venables | H04L 47/30 709/232 |

(Continued)

OTHER PUBLICATIONS

"International Search Report and Written Opinion of the International Searching Authority, for International Application No. PCT/US2021/037305, dated Sep. 16, 2021 (10 pages)".

*Primary Examiner* — Ramon A. Mercado
(74) *Attorney, Agent, or Firm* — Steven Stupp; Stewart Wiener

(57) ABSTRACT

An electronic device may implement a virtual elastic queue in memory, where, as needed, the virtual elastic queue grows in size to accommodate more queue elements, or shrinks in size to free up queue-element capacity and space in the memory. The virtual elastic queue may include a virtual queue and one or more physical queues, where the virtual queue provides a mapping to the one or more physical queues, and where a data structure may represent queue elements in the one or more physical queues. Notably, the virtual queue may point to the one or more physical queues, and the one or more physical queues may point to physical queue memory where data elements are enqueued and dequeued. Note that the virtual elastic queue may not have a predefined memory size and, up to a size of the memory, may not be constrained.

20 Claims, 9 Drawing Sheets

(56) References Cited

U.S. PATENT DOCUMENTS

| | | | |
|---|---|---|---|
| 2005/0228971 A1* | 10/2005 | Samra | G06F 9/5016 |
| | | | 712/217 |
| 2011/0002345 A1* | 1/2011 | Bian | H04L 49/901 |
| | | | 370/462 |
| 2016/0364171 A1* | 12/2016 | Frank | G06F 3/0683 |
| 2017/0302589 A1 | 10/2017 | Leafe et al. | |
| 2018/0129429 A1* | 5/2018 | Huang | G06F 12/08 |
| 2020/0090298 A1* | 3/2020 | Gould | G06F 9/4881 |
| 2020/0125290 A1* | 4/2020 | Shah | G06F 3/0679 |
| 2022/0043672 A1* | 2/2022 | Chhabra | G06F 9/4881 |
| 2022/0236903 A1* | 7/2022 | Kim | G06F 3/0656 |

* cited by examiner

VIRTUAL ELASTIC QUEUE

CROSS REFERENCE TO RELATED APPLICATIONS

This application claims priority under 35 U.S.C. 119(e) to: U.S. Provisional Application Ser. No. 63/046,469, "Virtual Elastic Queue," filed on Jun. 30, 2020, by Rakesh G. Hansalia, the contents of which are herein incorporated by reference.

FIELD

The described embodiments relate to techniques for storing information in a virtual elastic queue that can dynamically grow (or shrink), as needed, to accommodate more (or fewer) queue elements.

BACKGROUND

A queue is a linear data structure that sequentially passes a set of data from one or more processing entities (which are sometimes referred to as 'threads') to another thread in a system. There are typically one or more unrelated threads that are the producers of the data in a queue, and there are typically one or more related threads that are the consumers that dequeue the data. The queued data is carried in respective buffers. A reference to a data buffer and its size are usually carried in a queue element, which is of fixed or predefined size.

A queue is typically created of fixed size in memory that is predetermined at the time of creation based on the maximum number of queue elements required. Usually, a queue can handle a limited number of data elements simultaneously.

As more data are queued, the 'free' space in a queue reduces by the number of the queue elements used. When the free space reaches a condition where the next data cannot be queued, it 'hits' a queue-full condition. In the queue-full condition, there are two alternative options for handling the next data. Notably, the producer thread can simply drop the data, or it can retry queuing until it succeeds.

With more subsequent queuing requests simultaneously encountering the queue-full condition, the special handling of these requests can become a complicated task. Often, this entails using a locally owned auxiliary or secondary queue in the producer thread context as an extension of the actual queue. Because any thread can be a producer for a queue that can hit the same queue-full situation, every thread typically needs to implement such special handling. Moreover, a thread can be a producer thread for many queues. Consequently, the thread usually must implement the same special handling for each of those queues. This burden of special handling multiplies with the number of queues and the corresponding number of producers in the system. Furthermore, when there is no special handling implemented in a producer, the data element is inevitably not communicated (i.e., dropped), which adversely impacts the communication performance and the system function.

SUMMARY

An electronic device is described. This electronic device may include: a processor; and a memory that stores program instructions, where, when executed by the processor, the program instructions cause the electronic device to perform operations. Notably, during operation, the electronic device may implement a virtual elastic queue in the memory, where, as needed, the virtual elastic queue grows in size to accommodate more queue elements, or shrinks in size to free up queue-element capacity and space in the memory.

Moreover, the virtual elastic queue may include a virtual queue and one or more physical queues, where the virtual queue provides a mapping to the one or more physical queues, and where a data structure may represent queue elements in the one or more physical queues. Notably, the virtual queue may point to the one or more physical queues, and the one or more physical queues may point to physical queue memory where data elements are enqueued and dequeued.

For example, when the one or more physical queues includes multiple physical queues, a head-end pointer in the virtual queue may point to a first physical queue in the multiple physical queues, a tail-end pointer in the virtual queue may point to a last physical queue in the multiple physical queues, and a given physical queue, until the last physical queue, may point to a next physical queue in the multiple physical queues. Note that the given physical queue may have a physical queue size and a base address in the memory. Furthermore, the data structure may include a sequence of queue elements associated with the given physical queue and, after a last queue element in the sequence of queue elements associated with the given physical queue, there may be a logical extension to a next sequence of queue elements associated with the next physical queue. Additionally, the virtual queue may include a read pointer that points to a first queue element in the first physical queue with least-recent enqueued data that has yet to be dequeued, and a write pointer that points to a queue element in the one or more physical queues with most-recent enqueued data.

When data is enqueued in the virtual elastic queue and the one or more physical queues are not full, the data is written to a next available queue element following the write pointer, and the write pointer is incremented to point to the next available queue element. However, when data is enqueued in the virtual elastic queue and the one or more physical queues are full, a new physical queue is added to the one or more physical queues with a logical extension from a last queue element associated with the last physical queue to a first queue element associated with the new physical queue, and the data is written to the first queue element associated with the new physical queue. Moreover, the write pointer is changed to point to the first queue element associated with the new physical queue.

When data is dequeued from the virtual elastic queue, the data is dequeued from the first queue element in the first physical queue corresponding to the read pointer, and the read pointer is incremented to point to a next queue element in the data structure. Moreover, when the next queue element is included in the next physical queue, then the head-end pointer in the virtual queue is adjusted to point to the next physical queue and the first physical queue is removed from the one or more physical queues, thereby shrinking the virtual elastic queue.

In some embodiments, the virtual elastic queue may be transparent to one or more threads in the electronic device that use the virtual elastic queue, such that a given thread may ignore a size of a message queue associated with the virtual elastic queue.

Note that the virtual elastic queue may not have a predefined memory size. Moreover, up to a size of the memory, a memory size associated with the virtual elastic queue may not be constrained.

Another embodiment provides a computer-readable storage medium for use with the electronic device. When executed by the electronic device, this computer-readable storage medium causes the electronic device to perform at least some of the aforementioned operations.

Another embodiment provides a method, which may be performed by the electronic device. This method includes at least some of the aforementioned operations.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
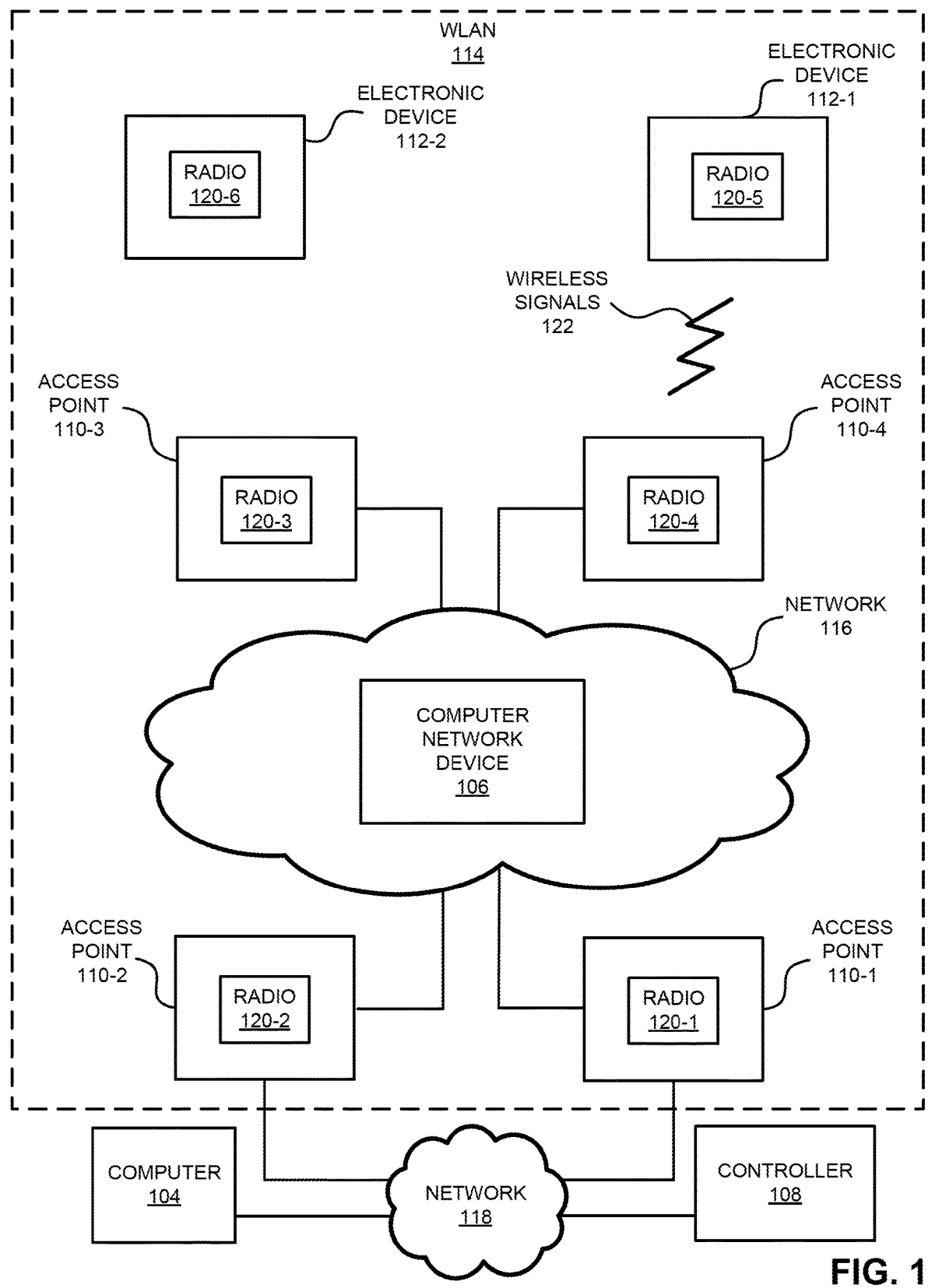
FIG. 1 is a block diagram illustrating an example of communication among access points and electronic devices in a network in accordance with an embodiment of the present disclosure.

An electronic device that implements a virtual elastic queue is described. During operation, the electronic device may implement the virtual elastic queue in memory, where, as needed, the virtual elastic queue grows in size to accommodate more queue elements, or shrinks in size to free up queue-element capacity and space in the memory. The virtual elastic queue may include a virtual queue and one or more physical queues, where the virtual queue provides a mapping to the one or more physical queues, and where a data structure may represent queue elements in the one or more physical queues. Notably, the virtual queue may point to the one or more physical queues, and the one or more physical queues may point to physical queue memory where data elements are enqueued and dequeued. Note that the virtual elastic queue may not have a predefined memory size and, up to a size of the memory, a memory size associated with the virtual elastic queue may not be constrained.

By dynamically adapting the number of physical queues in the virtual elastic queue, these storage techniques may improve communication performance and operation of the electronic device. For example, the storage techniques may reduce or eliminate dropped packets and queuing retries, may eliminate the need for special handling (and, thus, may eliminate the associated complexity), and may use system resources more efficiently. Consequently, the storage techniques may reduce the time, effort and cost of managing a queue, which may improve the user experience when using the electronic device.

In the discussion that follows, an access point and/or an electronic device (such as a recipient electronic device, which is sometimes referred to as a 'client') may communicate packets or frames in accordance with a wireless communication protocol, such as an Institute of Electrical and Electronics Engineers (IEEE) 802.11 standard (which is sometimes referred to as 'Wi-Fi,' from the Wi-Fi Alliance of Austin, Tex.), Bluetooth (from the Bluetooth Special Interest Group of Kirkland, Wash.), and/or another type of wireless interface. In the discussion that follows, Wi-Fi is used as an illustrative example. For example, an IEEE 802.11 standard may include one or more of: IEEE 802.11a, IEEE 802.11b, IEEE 802.11g, IEEE 802.11-2007, IEEE 802.11n, IEEE 802.11-2012, IEEE 802.11-2016, IEEE 802.11ac, IEEE 802.11ax, IEEE 802.11ba, IEEE 802.11be, or other present or future developed IEEE 802.11 technologies.

However, a wide variety of communication protocols (such as Long Term Evolution or LTE, another cellular-telephone communication protocol, etc.) may be used. The wireless communication may occur in one or more bands of frequencies, such as: a 900 MHz, a 2.4 GHz, a 5 GHz, 6 GHz, the Citizens Broadband Radio Spectrum or CBRS (e.g., a frequency band near 3.5 GHz), a band of frequencies used by LTE or another cellular-telephone communication protocol or a data communication protocol, and/or a 60 GHz frequency band. (Note that IEEE 802.11ad communication over a 60 GHz frequency band is sometimes referred to as 'WiGig.' In the present discussion, these embodiments also encompassed by 'Wi-Fi.') In some embodiments, communication between electronic devices may use multi-user transmission (such as orthogonal frequency division multiple access or OFDMA).

Moreover, the electronic device and/or the access point may communicate with one or more other access points and/or computers in a network using a wireless or a wired communication protocol, such as an IEEE 802.11 standard, an IEEE 802.3 standard (which is sometimes referred to as 'Ethernet') and/or another type of wired or wireless interface. In the discussion that follows, Ethernet is used as an illustrative example of communication between the electronic device and/or the access point and the one or more other access points and/or computers in the network.

FIG. 1 presents a block diagram illustrating an example of communication among one or more access points 110 and electronic devices 112 (such as a cellular telephone, and which are sometimes referred to as 'clients') in a WLAN 114 (which is used as an example of a network) in accordance with some embodiments. Access points 110 may communicate with each other in WLAN 114 using wireless and/or wired communication (such as by using Ethernet or a communication protocol that is compatible with Ethernet). Note that access points 110 may include a physical access point and/or a virtual access point that is implemented in software in an environment of an electronic device or a computer. In addition, at least some of access points 110 (such as access points 110-3 and 110-4) may communicate with electronic devices 112 using wireless communication.

The wired and/or wireless communication among access points 110 in WLAN 114 may occur via network 116 (such as an intra-net, a mesh network, point-to-point connections and/or the Internet) and may use a network communication protocol, such as Ethernet. For example, WLAN 114 may include a computer network device 106, such as a switch or a router.

Furthermore, the wireless communication using Wi-Fi may involve: transmitting advertising frames on wireless channels, detecting one another by scanning wireless channels, establishing connections (for example, by transmitting association or attach requests), and/or transmitting and receiving packets or frames (which may include the association requests and/or additional information as payloads). In some embodiments, the wired and/or wireless communication among access points 110 also involves the use of dedicated connections, such as via a peer-to-peer (P2P) communication technique. Therefore, access points 110 may support wired communication outside of WLAN 114 (such as Ethernet) and wireless communication within WLAN 114 (such as Wi-Fi), and one or more of access points 110 may also support a wired communication protocol for communicating via network 118 with electronic devices (such as a computer 104 or a controller 108 of WLAN 114, which may be remoted located from WLAN 114).

Figure 7:
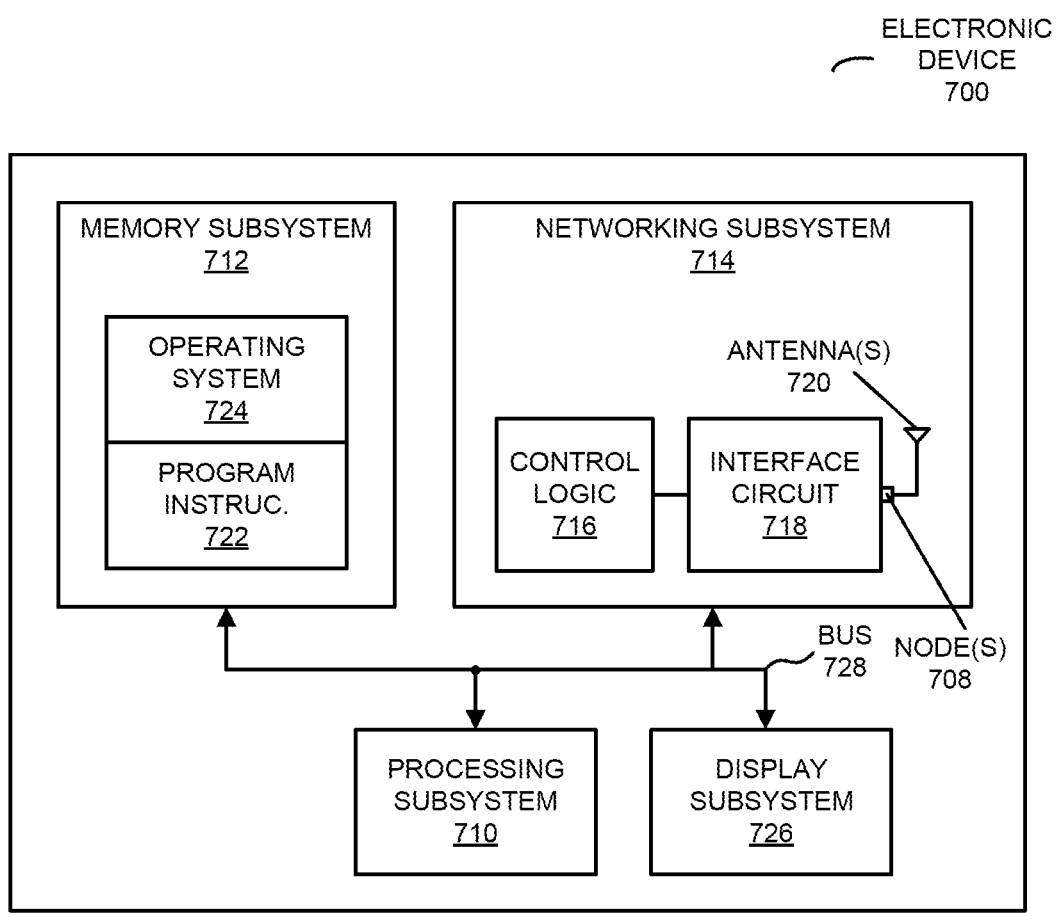
FIG. 7 is a block diagram illustrating an example of an electronic device in accordance with an embodiment of the present disclosure.

As described further below with reference to FIG. 7, computer network device 106, access points 110 and/or electronic devices 112 may include subsystems, such as a networking subsystem, a memory subsystem and a processor subsystem. In addition, access points 110 and electronic devices 112 may include radios 120 in the networking subsystems. More generally, access points 110 and electronic devices 112 can include (or can be included within) any electronic devices with the networking subsystems that enable access points 110 and electronic devices 112 to communicate with each other using wireless and/or wired communication. This wireless communication can comprise transmitting advertisements on wireless channels to enable access points 110 and/or electronic devices 112 to make initial contact or detect each other, followed by exchanging subsequent data/management frames (such as association requests and responses) to establish a connection, configure security options (e.g., Internet Protocol Security), transmit and receive packets or frames via the connection, etc. Note that while instances of radios 120 are shown in access points 110 and electronic devices 112, one or more of these instances may be different from the other instances of radios 120.

As can be seen in FIG. 1, wireless signals 122 (represented by a jagged line) are transmitted from radio 120-4 in access point 110-4. These wireless signals may be received by radio 120-5 in electronic device 112-1. Notably, access point 110-4 may transmit packets or frames. In turn, these packets or frames may be received by electronic device 112-1. Moreover, access point 110-4 may allow electronic device 112-1 to communicate with other electronic devices, computers and/or servers via networks 116 and/or 118.

Note that the communication among access points 110 and/or with electronic devices 112 (and, more generally, communication among components in WLAN 114) may be characterized by a variety of performance metrics, such as: a received signal strength (RSSI), a data rate, a data rate for successful communication (which is sometimes referred to as a 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

In the described embodiments processing a packet or frame in access points 110 and electronic devices 112 includes: receiving signals (such as wireless signals 122) corresponding to the packet or frame; decoding/extracting the packet or frame from received wireless signals 122 to acquire the packet or frame; and processing the packet or frame to determine information contained in the packet or frame.

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

As noted previously, a physical queue having a predefined or fixed size in memory in one of the electronic devices or computers in FIG. 1 (such as computer network device 106, which is used as an illustration in the discussion that follows) can result in delays, dropped packets or frames, and/or increased complexity when a queue-full condition is reached.

As described further below with reference to FIGS. 2-6B, in order to address these problems, computer network device 106 may use the storage techniques. Notably, computer network device 106 may implement a virtual elastic queue in memory, where, as needed, the virtual elastic queue grows in size to accommodate more queue elements, or shrinks in size to free up queue-element capacity and space in the memory.

Moreover, the virtual elastic queue may include a virtual queue and one or more physical queues, where the virtual queue provides a mapping to the one or more physical queues, and where a data structure may represent queue elements in the one or more physical queues. Notably, the virtual queue may point to the one or more physical queues, and the one or more physical queues may point to physical queue memory where data elements are enqueued and dequeued.

For example, when the one or more physical queues includes multiple physical queues, a head-end pointer in the virtual queue may point to a first physical queue in the multiple physical queues, a tail-end pointer in the virtual queue may point to a last physical queue in the multiple physical queues, and a given physical queue, until the last physical queue, may point to a next physical queue in the multiple physical queues. Note that the given physical queue may have a physical queue size and a base address in the memory. Furthermore, the data structure may include a sequence of queue elements associated with the given physical queue and, after a last queue element in the sequence of queue elements associated with the given physical queue, there may be a logical extension to a next sequence of queue elements associated with the next physical queue. Additionally, the virtual queue may include a read pointer that points to a first queue element in the first physical queue with least-recent enqueued data that has yet to be dequeued, and a write pointer that points to a queue element in the one or more physical queues with most-recent enqueued data.

When data is enqueued in the virtual elastic queue and the one or more physical queues are not full, the data is written to a next available queue element following the write pointer, and the write pointer is incremented to point to the next available queue element. However, when data is enqueued in the virtual elastic queue and the one or more physical queues are full, a new physical queue is added to the one or more physical queues with a logical extension from a last queue element associated with the last physical queue to a first queue element associated with the new physical queue, and the data is written to the first queue element associated with the new physical queue. Moreover, the write pointer is changed to point to the first queue element associated with the new physical queue.

Furthermore, when data is dequeued from the virtual elastic queue, the data is dequeued from the first queue element in the first physical queue corresponding to the read pointer, and the read pointer is incremented to point to a next queue element in the data structure. Moreover, when the next queue element is included in the next physical queue, then the head-end pointer in the virtual queue is adjusted to point to the next physical queue and the first physical queue is removed from the one or more physical queues, thereby shrinking the virtual elastic queue.

In some embodiments, the virtual elastic queue may be transparent to one or more threads in computer network device 106 that use the virtual elastic queue, such that a given thread may ignore a size of a message queue associated with the virtual elastic queue.

Note that the virtual elastic queue (between a producer and a consumer) may not have a predefined memory size. Moreover, up to a size of the memory, a memory size associated with the virtual elastic queue may not be constrained. This may provide protection from a rogue or malicious actor, or unintended use of the capabilities of the virtual elastic queue.

In this way, computer network device 106 may flexibly and dynamically adapt the size of the virtual elastic queue. This capability may improve communication performance (e.g., in WLAN 114), function of computer network device 106 and/or usage of resources in computer network device 106. Consequently, the storage techniques may improve the user experience when using computer network device 106.

Figure 2:
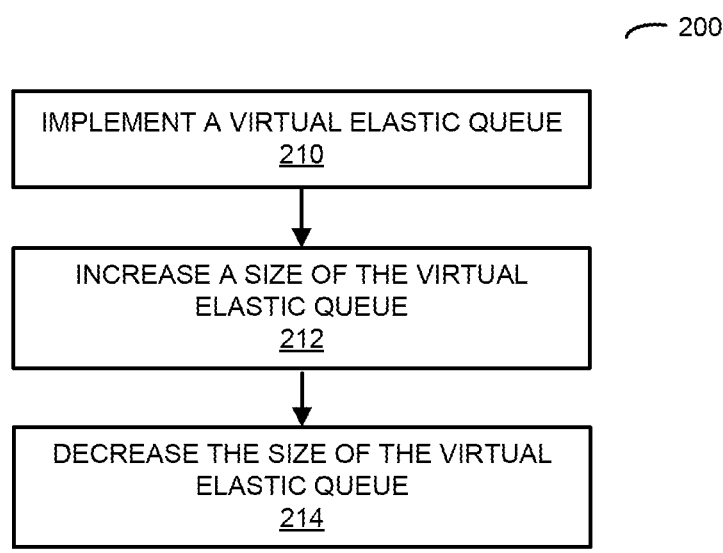
FIG. 2 is a flow diagram illustrating an example of a method for implementing a virtual elastic queue using an electronic device in FIG. 1 in accordance with an embodiment of the present disclosure.

We now describe embodiments of a method. FIG. 2 presents a flow diagram illustrating an example of a method 200 for implementing a virtual elastic queue in accordance with some embodiments. This method may be performed by an electronic device (such as computer 104 or computer network device 106 in FIG. 1).

During operation, the electronic device may implement the virtual elastic queue (operation 210) in memory. Moreover, the electronic device may: increase, as needed, a size of the virtual elastic queue (operation 212) to accommodate more queue elements; and decrease, as needed, the size of the virtual elastic queue (operation 214) to free up queue-element capacity and space in the memory.

The virtual elastic queue may include a virtual queue and one or more physical queues, where the virtual queue provides a mapping to the one or more physical queues, and where a data structure may represent queue elements in the one or more physical queues. Notably, the virtual queue may point to the one or more physical queues, and the one or more physical queues may point to physical queue memory where data elements are enqueued and dequeued.

For example, when the one or more physical queues includes multiple physical queues, a head-end pointer in the virtual queue may point to a first physical queue in the multiple physical queues, a tail-end pointer in the virtual queue may point to a last physical queue in the multiple physical queues, and a given physical queue, until the last physical queue, may point to a next physical queue in the multiple physical queues. Note that the given physical queue may have a physical queue size and a base address in the memory. Furthermore, the data structure may include a sequence of queue elements associated with the given physical queue and, after a last queue element in the sequence of queue elements associated with the given physical queue, there may be a logical extension to a next sequence of queue elements associated with the next physical queue. Additionally, the virtual queue may include a read pointer that points to a first queue element in the first physical queue with least-recent enqueued data that has yet to be dequeued, and a write pointer that points to a queue element in the one or more physical queues with most-recent enqueued data.

When data is enqueued in the virtual elastic queue and the one or more physical queues are not full, the data is written to a next available queue element following the write pointer, and the write pointer is incremented to point to the next available queue element. However, when data is enqueued in the virtual elastic queue and the one or more physical queues are full, a new physical queue is added to the one or more physical queues with a logical extension from a last queue element associated with the last physical queue to a first queue element associated with the new physical queue, and the data is written to the first queue element associated with the new physical queue. Moreover, the write pointer is changed to point to the first queue element associated with the new physical queue.

Furthermore, when data is dequeued from the virtual elastic queue, the data is dequeued from the first queue element in the first physical queue corresponding to the read pointer, and the read pointer is incremented to point to a next queue element in the data structure. Moreover, when the next queue element is included in the next physical queue, then the head-end pointer in the virtual queue is adjusted to point to the next physical queue and the first physical queue is removed from the one or more physical queues, thereby shrinking the virtual elastic queue.

In some embodiments, the virtual elastic queue may be transparent to one or more threads in the electronic device that use the virtual elastic queue, such that a given thread may ignore a size of a message queue associated with the virtual elastic queue.

Note that the virtual elastic queue may not have a predefined memory size. Moreover, up to a size of the memory, a memory size associated with the virtual elastic queue may not be constrained.

In some embodiments of method 200, there may be additional or fewer operations. Furthermore, the order of the operations may be changed, and/or two or more operations may be combined into a single operation.

Figure 3:
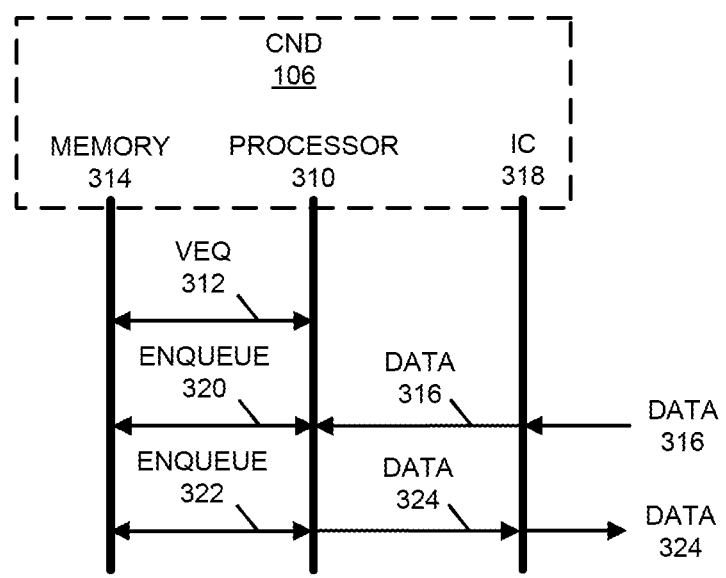
FIG. 3 is a drawing illustrating an example of communication among components in an electronic device in FIG. 1 in accordance with an embodiment of the present disclosure.

FIG. 3 presents a drawing illustrating an example of communication among components in computer network device (CND) 106 in accordance with some embodiments. Notably, processor 310 in computer network device 106 may implement a virtual elastic queue (VEQ) 312 in memory 314 in computer network device 106. This virtual elastic queue 312 may include a virtual queue and one or more physical queues with queue elements.

As data 316 associated with a thread is received from interface circuit 318 in computer network device 106, processor 310 may store or enqueue 320 data 316 in an available queue element following a write pointer in the virtual queue to a queue element with most-recent enqueued data. If there is no available queue element in the existing one or more physical queues in virtual elastic queue 312, processor 310 may increase a size of virtual elastic queue 312 by adding another physical queue in memory 314.

Alternatively or additionally, processor 310 may dequeue 322 data 324 from a queue element with least-recent enqueued data in one or more physical queues based at least in part on a read pointer in the virtual queue. If this queue element is the last queue element in one of the physical queues, processor 310 may remove this physical queue from the one or more physical queues, thereby shrinking a size of virtual elastic queue 312. Then, processor 310 may provided data 324 to interface circuit 318, which outputs data 324 associated with a thread or another thread.

While FIG. 3 illustrates communication between components using unidirectional or bidirectional communication with lines having single arrows or double arrows, in general the communication in a given operation in these figures may involve unidirectional or bidirectional communication.

In the storage techniques, a queue (such as a first-in first-out or FIFO) may be designed and implemented as a virtual elastic queue, so that it can grow, as needed, to accommodate more queue elements. Similarly, the virtual elastic queue may also shrink in size, as needed, to free up queue elements or queue-element capacity. When growing, the virtual elastic queue can consume more memory and, when shrinking, it can free up memory. The virtual elastic queue can, therefore, accommodate an indefinite number of queue elements, ideally limited only by the amount of free memory in the pool from which it can grow. However, in some embodiments, an artificial, system-defined limit may be imposed on its growth, so that uncontrolled growth does not impact the system functions that are dependent on other queues.

Note that an experiment was conducted to convert the message queues, which are managed by an Inter-Task Communication (ITC) framework in an operating system for a switch or a router, into virtual elastic queues. There were no changes in the application programming interface (API) of the ITC and, therefore, the interaction with the ITC. The conversion to the virtual elastic queue was transparent to the threads using the ITC. The ITC silently ignored the size of the message queue passed in as a value during the creation of the message queues.

A virtual elastic queue may include a virtual queue (VQ) and one or more physical queues (PQs). Thus, in a virtual elastic queue, a single virtual queue may map to the one or more physical queues. Moreover, a data structure representing the virtual queue may sometimes be referred to as 'a VQ-node' and a physical queue may be referred to (and may be represented by) 'a PQ-node.' A VQ-node may bind one or more PQ-nodes. When a virtual elastic queue is created, it may include a VQ-node, a PQ-node, and a data structure representing queue elements (QEs) in the actual physical queue(s). The VQ-node may point to the PQ-node, and the PQ-node may point to the physical queue memory where data elements are enqueued and dequeued.

Figure 4:
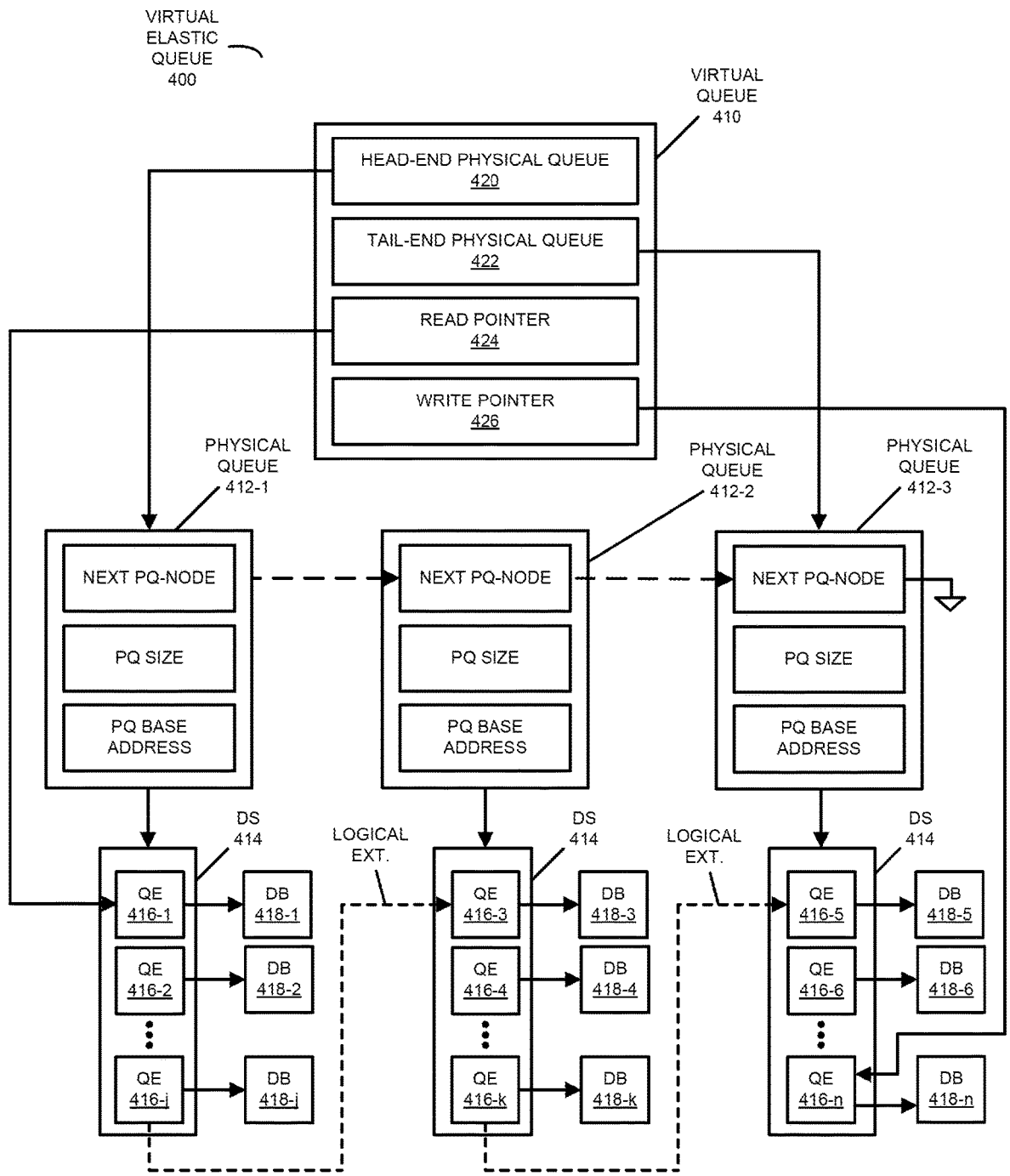
FIG. 4 is a drawing illustrating a technique for implementing a virtual elastic queue in accordance with an embodiment of the present disclosure.

This is illustrated in FIG. 4, which presents a drawing illustrating a technique for implementing a virtual elastic queue 400 in accordance with some embodiments. Notably, virtual elastic queue 400 may include: a virtual queue 410, and three physical queues 412. Each of physical queues (PQ-nodes) 412 may have a corresponding sequences of queue elements (QEs) 416 in data structure (DS) 414. Note that each of queue elements 416 may be associated with a data buffers (DBs) 418 or storage locations in memory (i.e., physical queue memory).

Virtual queue 410 may include: a head-end physical queue (PQ-head) 420, a tail-end physical queue (PQ-tail) 422, a read (head) pointer 424, and a write (tail) pointer 426. Head-end physical queue 420 is physical queue 412-1 that includes least-recent enqueued data that is yet to be dequeued. This least-recent enqueued data is in the queue element specified by read pointer 424. Moreover, tail-end physical queue 422 is physical queue 412-3 that includes most-recent enqueued data in a queue element specified by write pointer 426.

When a producer calls the enqueue API (or queue manager) for enqueuing into virtual elastic queue 400, it accesses the corresponding VQ-node for virtual queue 410 and retrieves the PQ-node corresponding to tail-end physical queue 422 (which is physical queue 412-3). If physical queue 412-3 is not full, then the new data element is added at the tail of physical queue 412-3 and the new data element becomes the new write pointer 426. Alternatively, when a new data element is being enqueued and there is no space in physical queue 412-3, then virtual elastic queue 400 will grow to accommodate more queue elements that can be used to store data elements. Notably, a size of virtual elastic queue 400 may be increased by creating or adding a new physical queue and a corresponding new PQ-node, and linking the new PQ-node with a preceding PQ-node that is associated with the current tail-end physical queue 422.

Figure 5A:
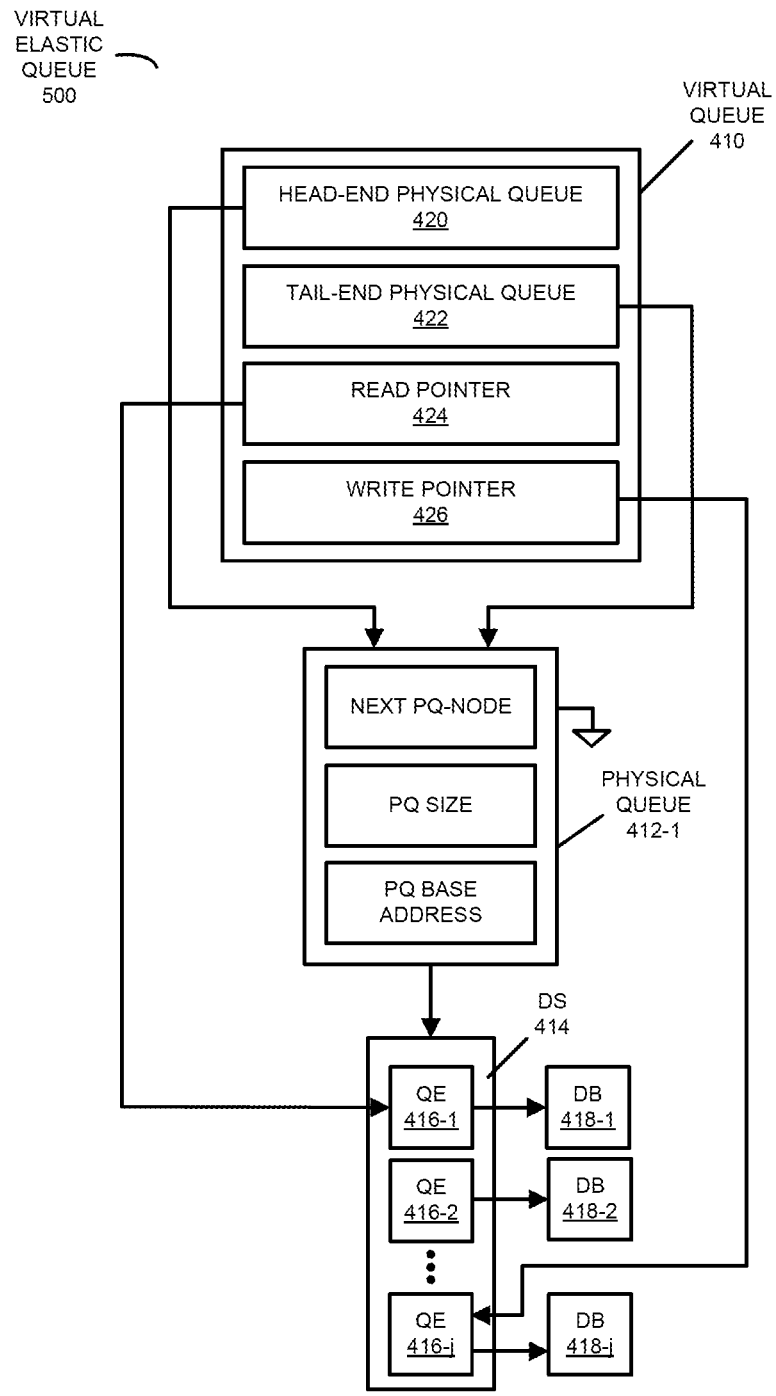
FIG. 5A is a drawing illustrating a technique for implementing a virtual elastic queue in accordance with an embodiment of the present disclosure.
Figure 5B:
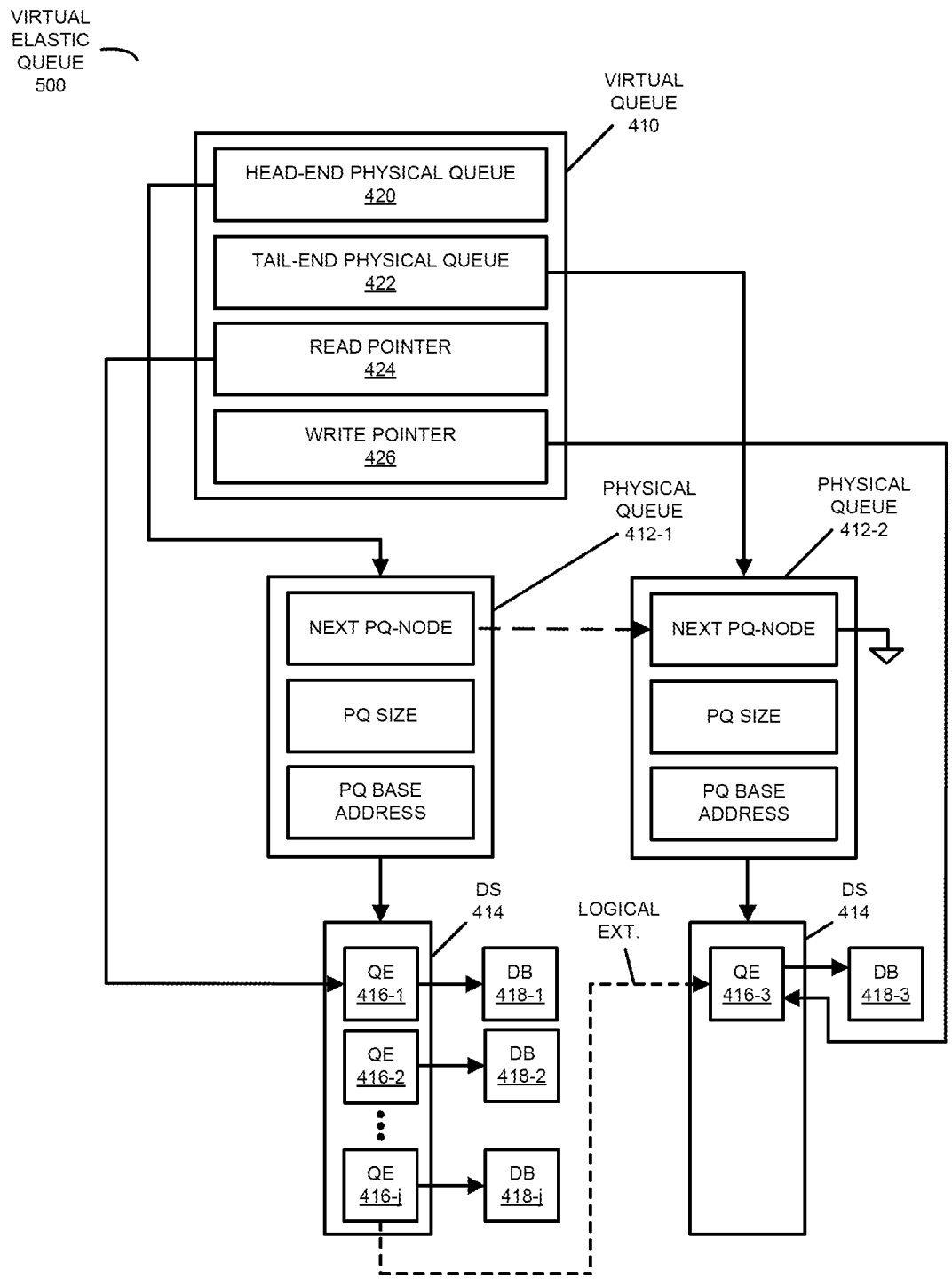
FIG. 5B is a drawing illustrating a technique for implementing a virtual elastic queue in accordance with an embodiment of the present disclosure.

Once virtual elastic queue 400 is extended, tail-end physical queue 422 is modified to point to the new PQ-node (to identify the new tail end of virtual elastic queue 400), the new data element is enqueued in a first available queue element in the new physical queue, and write pointer 426 is updated to point to this first queue element. This growth is shown in FIGS. 5A and 5B, which presents drawings illustrating a technique for implementing a virtual elastic queue 500 in accordance with some embodiments.

When a consumer calls the dequeue API for dequeuing data from a virtual elastic queue, it may access the corresponding VQ-node may retrieve the PQ-node corresponding to head-end physical queue 420 (which is physical queue 412-1). Then, it may retrieve the head data element at read pointer 424 for return to the caller, and may move read pointer 424 to a next queue element (and, thus, a next data element) in the virtual elastic queue.

Figure 6A:
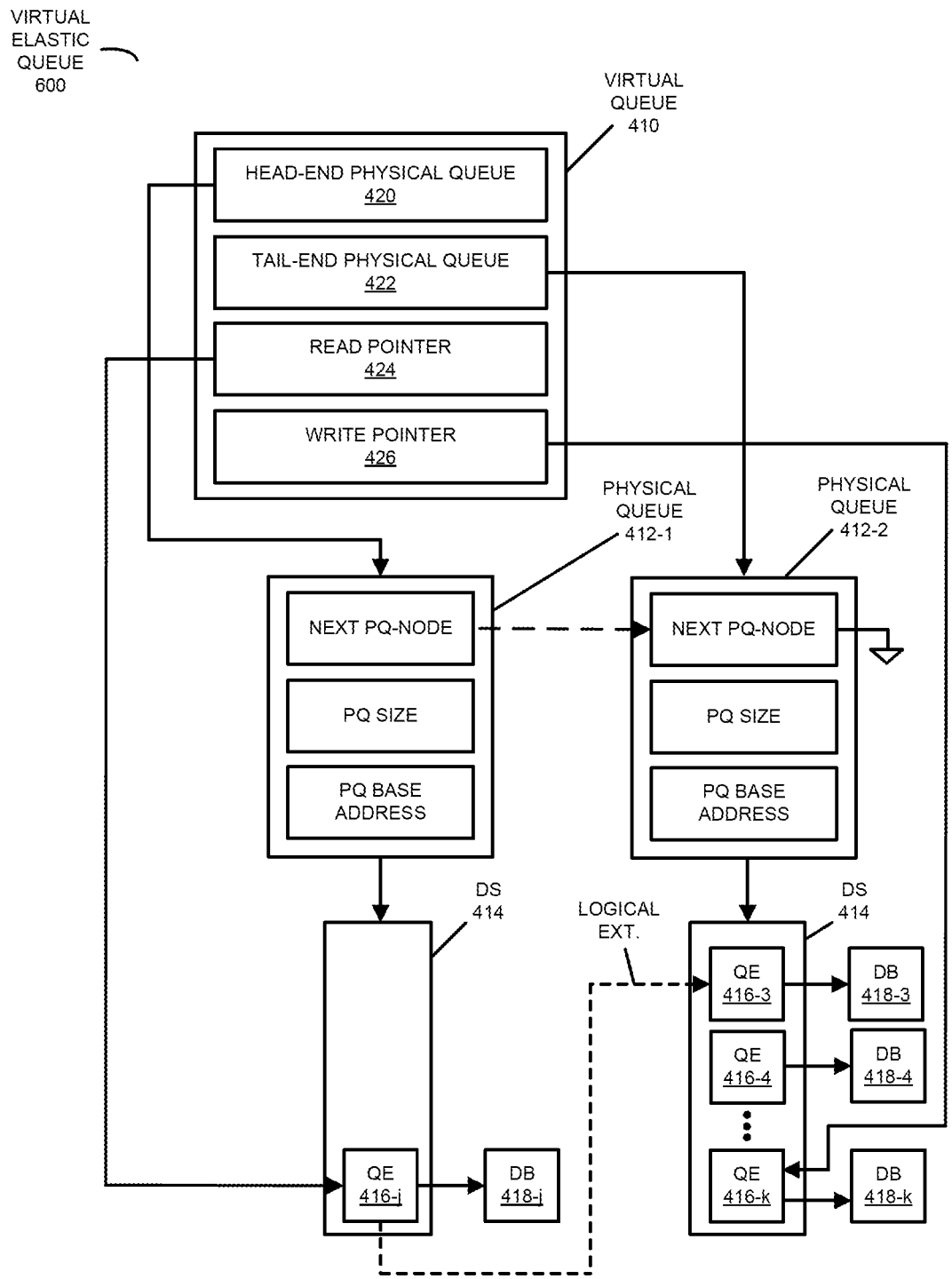
FIG. 6A is a drawing illustrating a technique for implementing a virtual elastic queue in accordance with an embodiment of the present disclosure.
Figure 6B:
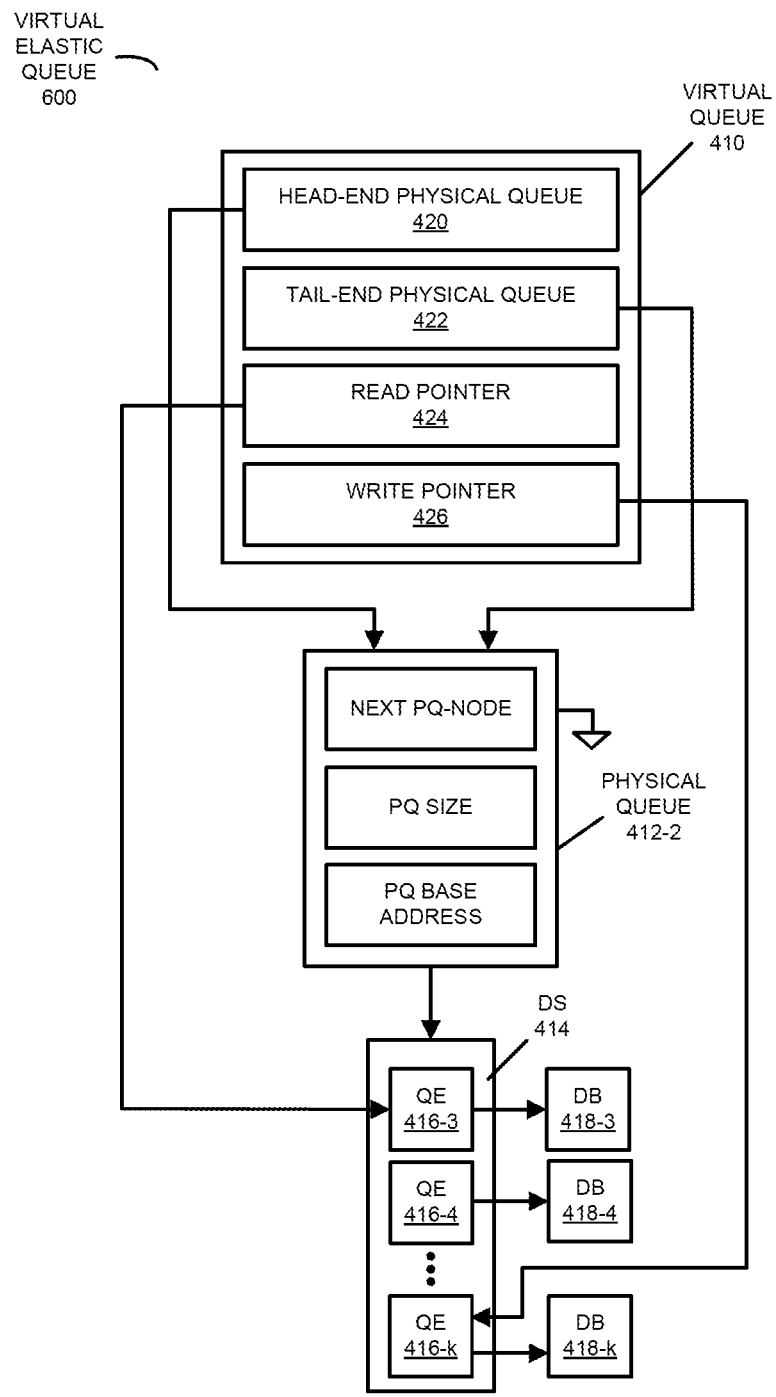
FIG. 6B is a drawing illustrating a technique for implementing a virtual elastic queue in accordance with an embodiment of the present disclosure.

If the next queue element falls or is included in the current PQ-node (i.e., physical queue 412-1, head-end physical queue 420 in virtual queue 410 is unchanged. However, if, upon dequeuing the current head data element, the next queue element (which includes a new head data element) falls or is included in a next physical queue that is logically next to head-end physical queue 420 (i.e., physical queue 412-2), then head-end physical queue 420 in virtual queue 410 is adjusted to the PQ-node of physical queue 412-2, and a first queue element in physical queue 412-2 becomes read pointer 424. Furthermore, the previous head-end physical queue 420 (i.e., physical queue 412-1) is freed with its corresponding PQ-node. This dequeuing with virtual elastic queue shrinkage is shown in FIGS. 6A and 6B, which presents drawings illustrating a technique for implementing a virtual elastic queue 400 in accordance with some embodiments.

We now describe embodiments of an electronic device, which may perform at least some of the operations in the storage techniques. FIG. 7 presents a block diagram illustrating an example of an electronic device 700 in accordance with some embodiments, such as one of computer 104, computer network device 106, controller 108, one of access points 110 or one of electronic devices 112. This electronic device includes processing subsystem 710, memory subsystem 712, and networking subsystem 714. Processing subsystem 710 includes one or more devices configured to perform computational operations. For example, processing subsystem 710 can include one or more microprocessors, ASICs, microcontrollers, programmable-logic devices, one or more graphics process units (GPUs) and/or one or more digital signal processors (DSPs).

Memory subsystem 712 includes one or more devices for storing data and/or instructions for processing subsystem 710 and networking subsystem 714. For example, memory subsystem 712 can include dynamic random access memory (DRAM), static random access memory (SRAM), and/or other types of memory. In some embodiments, instructions for processing subsystem 710 in memory subsystem 712 include: one or more program modules or sets of instructions (such as program instructions 722 or operating system 724), which may be executed by processing subsystem 710. Note that the one or more computer programs may constitute a computer-program mechanism. Moreover, instructions in the various modules in memory subsystem 712 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 710.

In addition, memory subsystem 712 can include mechanisms for controlling access to the memory. In some embodiments, memory subsystem 712 includes a memory hierarchy that comprises one or more caches coupled to a memory in electronic device 700. In some of these embodiments, one or more of the caches is located in processing subsystem 710.

In some embodiments, memory subsystem 712 is coupled to one or more high-capacity mass-storage devices (not shown). For example, memory subsystem 712 can be coupled to a magnetic or optical drive, a solid-state drive, or another type of mass-storage device. In these embodiments, memory subsystem 712 can be used by electronic device 700 as fast-access storage for often-used data, while the mass-storage device is used to store less frequently used data.

Networking subsystem 714 includes one or more devices configured to couple to and communicate on a wired and/or wireless network (i.e., to perform network operations), including: control logic 716, an interface circuit 718 and one or more antennas 720 (or antenna elements). (While FIG. 7 includes one or more antennas 720, in some embodiments electronic device 700 includes one or more nodes, such as nodes 708, e.g., a network node that can be coupled or connected to a network or link, or an antenna node, connector or a metal pad that can be coupled to the one or more antennas 720. Thus, electronic device 700 may or may not include the one or more antennas 720.) For example, networking subsystem 714 can include a Bluetooth™ networking system, a cellular networking system (e.g., a 3G/4G/5G network such as UMTS, LTE, etc.), a universal serial bus (USB) networking system, a networking system based on the standards described in IEEE 802.11 (e.g., a Wi-Fi® networking system), an Ethernet networking system, a cable modem networking system, and/or another networking system.

Note that a transmit or receive antenna pattern (or antenna radiation pattern) of electronic device 700 may be adapted or changed using pattern shapers (such as reflectors) in one or more antennas 720 (or antenna elements), which can be independently and selectively electrically coupled to ground to steer the transmit antenna pattern in different directions. Thus, if one or more antennas 720 include N antenna pattern shapers, the one or more antennas may have $2^N$ different antenna pattern configurations. More generally, a given antenna pattern may include amplitudes and/or phases of signals that specify a direction of the main or primary lobe of the given antenna pattern, as well as so-called 'exclusion regions' or 'exclusion zones' (which are sometimes referred to as 'notches' or 'nulls'). Note that an exclusion zone of the given antenna pattern includes a low-intensity region of the given antenna pattern. While the intensity is not necessarily zero in the exclusion zone, it may be below a threshold, such as 3 dB or lower than the peak gain of the given antenna pattern. Thus, the given antenna pattern may include a local maximum (e.g., a primary beam) that directs gain in the direction of electronic device 700 that is of interest, and one or more local minima that reduce gain in the direction of other electronic devices that are not of interest. In this way, the given antenna pattern may be selected so that communication that is undesirable (such as with the other electronic devices) is avoided to reduce or eliminate adverse effects, such as interference or crosstalk.

Networking subsystem 714 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 700 may use the mechanisms in networking subsystem 714 for performing simple wireless communication between the electronic devices, e.g., transmitting advertising or beacon frames and/or scanning for advertising frames transmitted by other electronic devices as described previously.

Within electronic device 700, processing subsystem 710, memory subsystem 712, and networking subsystem 714 are coupled together using bus 728. Bus 728 may include an electrical, optical, and/or electro-optical connection that the subsystems can use to communicate commands and data among one another. Although only one bus 728 is shown for clarity, different embodiments can include a different number or configuration of electrical, optical, and/or electro-optical connections among the subsystems.

In some embodiments, electronic device 700 includes a display subsystem 726 for displaying information on a display, which may include a display driver and the display, such as a liquid-crystal display, a multi-touch touchscreen, etc.

Electronic device 700 can be (or can be included in) any electronic device with at least one network interface. For example, electronic device 700 can be (or can be included in): a desktop computer, a laptop computer, a subnotebook/ netbook, a server, a tablet computer, a smartphone, a cellular telephone, a smartwatch, a consumer-electronic device, a portable computing device, an access point, a transceiver, a router, a switch, communication equipment, a computer network device, a stack of computer network devices, a controller, test equipment, and/or another electronic device.

Although specific components are used to describe electronic device 700, in alternative embodiments, different components and/or subsystems may be present in electronic device 700. For example, electronic device 700 may include one or more additional processing subsystems, memory subsystems, networking subsystems, and/or display subsystems. Additionally, one or more of the subsystems may not be present in electronic device 700. Moreover, in some embodiments, electronic device 700 may include one or more additional subsystems that are not shown in FIG. 7. Also, although separate subsystems are shown in FIG. 7, in some embodiments some or all of a given subsystem or component can be integrated into one or more of the other subsystems or component(s) in electronic device 700. For example, in some embodiments program instructions 722 are included in operating system 724 and/or control logic 716 is included in interface circuit 718. In some embodiments, the storage techniques are implemented using information in layer 2 and/or layer 3 of the OSI model.

Moreover, the circuits and components in electronic device 700 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of electronic device 700 and/or networking subsystem 714. The integrated circuit may include hardware and/or software mechanisms that are used for transmitting wireless signals from electronic device 700 and receiving signals at electronic device 700 from other electronic devices. Aside from the mechanisms herein described, radios are generally known in the art and hence are not described in detail. In general, networking subsystem 714 and/or the integrated circuit can include any number of radios. Note that the radios in multiple-radio embodiments function in a similar way to the described single-radio embodiments.

In some embodiments, networking subsystem 714 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used Ethernet and a Wi-Fi communication protocol as an illustrative example, in other embodiments a wide variety of communication protocols and, more generally, wired and/or wireless communication techniques may be used. Thus, the storage techniques may be used with a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the storage techniques may be implemented using program instructions 722, operating system 724 (such as a driver for interface circuit 718) or in firmware in interface circuit 718. Alternatively or additionally, at least some of the operations in the storage techniques (such as one of the filters in an access control list) may be implemented in a physical layer, such as hardware in interface circuit 718.

In the preceding description, we refer to 'some embodiments.' Note that 'some embodiments' describes a subset of all of the possible embodiments, but does not always specify the same subset of embodiments. Moreover, note that numerical values in the preceding embodiments are illustrative examples of some embodiments. In other embodiments of the storage techniques, different numerical values may be used.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
a processor; and
memory configured to store program instructions, wherein, when executed by the processor, the program instructions cause the electronic device to perform one or more operations comprising:

implementing a virtual elastic queue in the memory, wherein, as needed, the virtual elastic queue grows in size to accommodate more queue elements, or shrinks in size to free up queue-element capacity and space in the memory;

wherein the virtual elastic queue comprises a virtual queue and one or more physical queues;

wherein the virtual queue provides a mapping to the one or more physical queues, and a data structure represents queue elements in the one or more physical queues; and wherein, when the one or more physical queues comprise multiple physical queues, a head-end pointer in the virtual queue points to a first physical queue in the multiple physical queues, a tail-end pointer in the virtual queue points to a last physical queue in the multiple physical queues, and a given physical queue, until the last physical queue, points to a next physical queue in the multiple physical queues.

2. The electronic device of claim 1, wherein the virtual elastic queue does not have a predefined memory size.

3. The electronic device of claim 1, wherein, up to a size of the memory, a memory size associated with the virtual elastic queue is not constrained.

4. The electronic device of claim 1, wherein the virtual elastic queue is transparent to one or more threads in the electronic device that use the virtual elastic queue, such that a given thread may ignore a size of a message queue associated with the virtual elastic queue.

5. The electronic device of claim 1, wherein the virtual queue points to the one or more physical queues, and the one or more physical queues point to physical queue memory where data elements are enqueued and dequeued.

6. The electronic device of claim 1, wherein the given physical queue has a physical queue size and a base address in the memory.

7. The electronic device of claim 1, wherein the data structure comprises a sequence of queue elements associated with the given physical queue and, after a last queue element in the sequence of queue elements associated with the given physical queue, there is a logical extension to a next sequence of queue elements associated with the next physical queue.

8. The electronic device of claim 1, wherein the virtual queue comprises a read pointer that points to a first queue element in the first physical queue with least-recent enqueued data that has yet to be dequeued, and a write pointer that points to a queue element in the one or more physical queues with most-recent enqueued data.

9. The electronic device of claim 8, wherein, when data is enqueued in the virtual elastic queue and the one or more physical queues are not full, the data is written to a next available queue element following the write pointer, and the write pointer is incremented to point to the next available queue element.

10. The electronic device of claim 8, wherein, when data is enqueued in the virtual elastic queue and the one or more physical queues are full, a new physical queue is added to the one or more physical queues with a logical extension from a last queue element associated with the last physical queue to a first queue element associated with the new physical queue, the data is written to the first queue element associated with the new physical queue, and the write pointer is changed to point to the first queue element associated with the new physical queue.

11. The electronic device of claim 8, wherein, when data is dequeued from the virtual elastic queue, the data is dequeued from the first queue element in the first physical queue corresponding to the read pointer, and the read pointer is incremented to point to a next queue element in the data structure.

12. The electronic device of claim 11, wherein, when the next queue element is included in the next physical queue, then the head-end pointer in the virtual queue is adjusted to point to the next physical queue and the first physical queue is removed from the one or more physical queues.

13. A non-transitory computer-readable storage medium for use in conjunction with an electronic device, the computer-readable storage medium storing program instructions that, when executed by the electronic device, causes the electronic device to perform operations comprising:

implementing a virtual elastic queue in memory;

increasing, as needed, a size of the virtual elastic queue to accommodate more queue elements; and decreasing, as needed, the size of the virtual elastic queue to free up queue-element capacity and space in the memory, wherein the virtual elastic queue comprises a virtual queue and one or more physical queues;

wherein the virtual queue provides a mapping to the one or more physical queues, and a data structure represents queue elements in the one or more physical queues; and wherein, when the one or more physical queues comprise multiple physical queues, a head-end pointer in the virtual queue points to a first physical queue in the multiple physical queues, a tail-end pointer in the virtual queue points to a last physical queue in the multiple physical queues, and a given physical queue, until the last physical queue, points to a next physical queue in the multiple physical queues.

14. The non-transitory computer-readable storage medium of claim 13, wherein the virtual elastic queue does not have a predefined memory size.

15. The non-transitory computer-readable storage medium of claim 13, wherein the virtual queue comprises a write pointer that points to a queue element associated with the last physical queue in the one or more physical queues with most-recent enqueued data; and wherein the operations comprise:

when data is enqueued in the virtual elastic queue and the one or more physical queues are full, adding a new physical queue is added to the one or more physical queues with a logical extension from a last queue element associated with the last physical queue to a first queue element associated with the new physical queue;

writing the data to the first queue element associated with the new physical queue and changing the write pointer to point to the first queue element associated with the new physical queue.

16. The non-transitory computer-readable storage medium of claim 13, wherein the virtual queue comprises a read pointer that points to a first queue element in the first physical queue in the one or more physical queues with least-recent enqueued data that has yet to be dequeued;

wherein the operations comprise:

when data is dequeued from the virtual elastic queue, dequeuing the data from the first queue element in the first physical queue corresponding to the read pointer, and incrementing the read pointer to point to a next queue element in the data structure; and when the next queue element is included in the next physical queue, adjusting the head-end pointer in the virtual queue to point to the next physical queue and removing the first physical queue from the one or more physical queues.

17. A method for implementing a virtual elastic queue, comprising:
by an electronic device:
implementing the virtual elastic queue in memory;
increasing, as needed, a size of the virtual elastic queue to accommodate more queue elements; and
decreasing, as needed, the size of the virtual elastic queue to free up queue-element capacity and space in the memory, wherein the virtual elastic queue comprises a virtual queue and one or more physical queues;
wherein the virtual queue provides a mapping to the one or more physical queues, and a data structure represents queue elements in the one or more physical queues; and
wherein, when the one or more physical queues comprise multiple physical queues, a head-end pointer in the virtual queue points to a first physical queue in the multiple physical queues, a tail-end pointer in the virtual queue points to a last physical queue in the multiple physical queues, and a given physical queue, until the last physical queue, points to a next physical queue in the multiple physical queues.

18. The method of claim 17, wherein the virtual elastic queue does not have a predefined memory size.

19. The method of claim 17, wherein the virtual queue comprises a write pointer that points to a queue element associated with the last physical queue in the one or more physical queues with most-recent enqueued data; and wherein, when data is enqueued in the virtual elastic queue and the one or more physical queues are full, the method comprises:
adding a new physical queue to the one or more physical queues with a logical extension from a last queue element associated with the last physical queue to a first queue element associated with the new physical queue;
writing the data to the first queue element associated with the new physical queue; and
changing the write pointer to point to the first queue element associated with the new physical queue.

20. The method of claim 17, wherein the virtual queue comprises a read pointer that points to a first queue element in the first physical queue in the one or more physical queues with least-recent enqueued data that has yet to be dequeued;
wherein the method comprises:
when data is dequeued from the virtual elastic queue, dequeuing data from the first queue element in the first physical queue corresponding to the read pointer, and incrementing the read pointer to point to a next queue element in the data structure; and
when the next queue element is included in the next physical queue, adjusting the head-end pointer in the virtual queue to point to the next physical queue and removing the first physical queue from the one or more physical queues.

\* \* \* \* \*

UNITED STATES PATENT AND TRADEMARK OFFICE
CERTIFICATE OF CORRECTION

PATENT NO. : 11,650,744 B2
APPLICATION NO. : 17/352476
DATED : May 16, 2023
INVENTOR(S) : Rakesh G. Hansalia Page 1 of 1

It is certified that error appears in the above-identified patent and that said Letters Patent is hereby corrected as shown below:

In the Claims

Column 16, Line 46, Claim 15: Please correct "new physical queue is added to the" to read --new physical queue to the--

Signed and Sealed this
Twenty-fifth Day of July, 2023

Katherine Kelly Vidal
*Director of the United States Patent and Trademark Office*